April 5, 1949. G. K. SCHNABLE 2,466,331
FOCUSING MECHANISM FOR CATHODE-RAY TUBES
Filed April 18, 1947 2 Sheets-Sheet 1
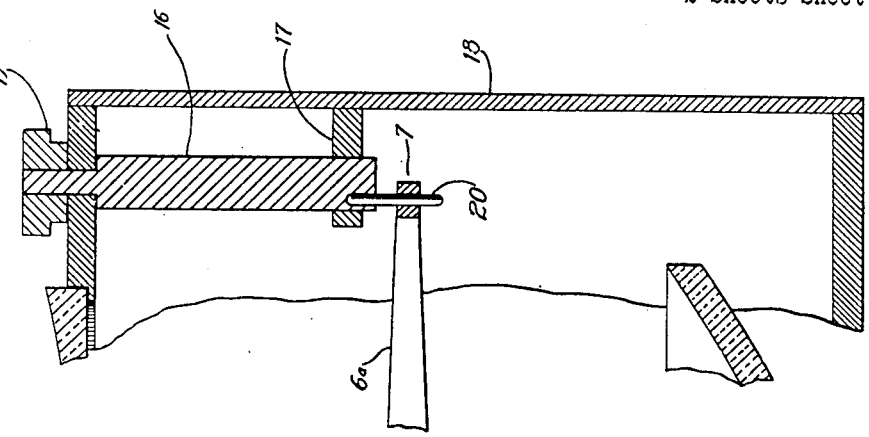
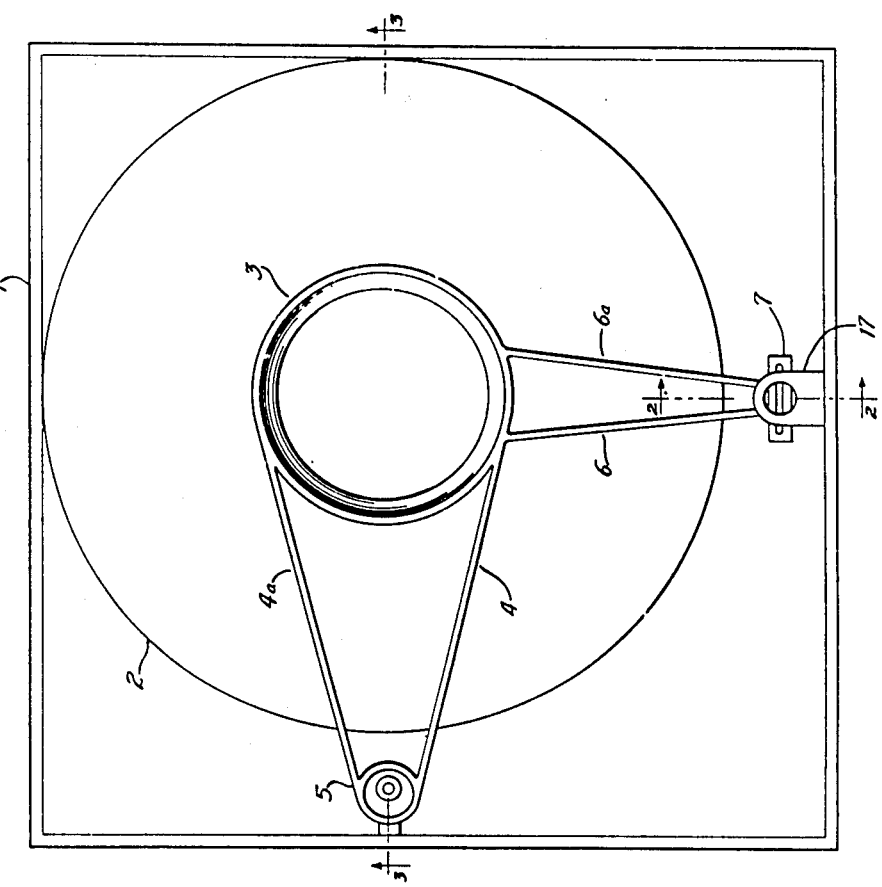
INVENTOR
GEORGE K. SCHNABLE
BY Paul Kolisch
ATTORNEY

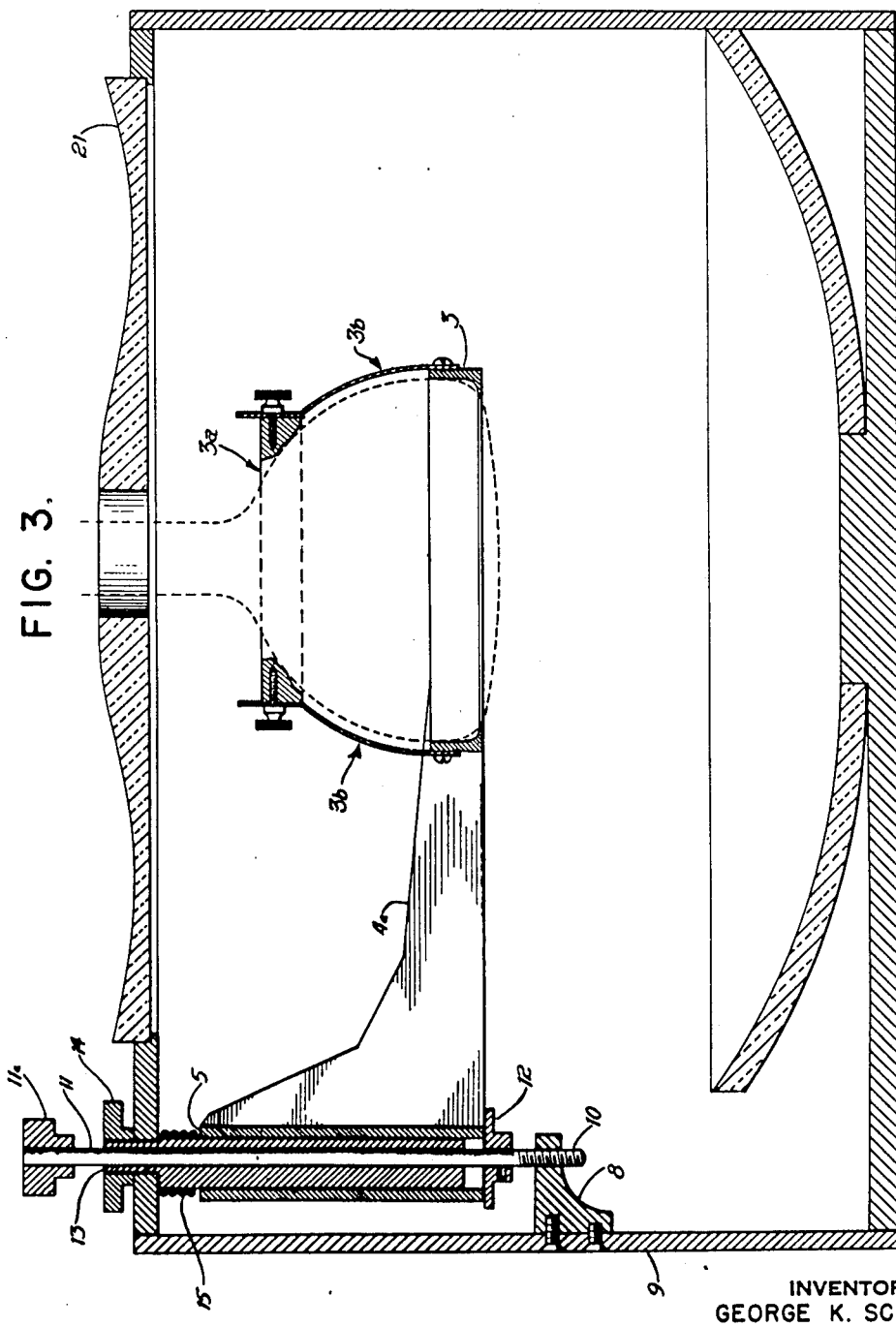

Patented Apr. 5, 1949

2,466,331

UNITED STATES PATENT OFFICE 2,466,331

FOCUSING MECHANISM FOR CATHODE-RAY TUBES

George K. Schnable, Riverside, Ill., assignor to The Rauland Corporation, Chicago, Ill., a corporation of Illinois Application April 18, 1947, Serial No. 742,446

6 Claims. (Cl. 178—7.5)

This invention relates to an arrangement for supporting and focusing an end projection cathode ray tube in a television projection system.

It is well known that in television projection systems means are required for closely and conveniently controlling the position of the image emitting surface of the tube with respect to other optical elements of the projection system, and for readjusting its position after tube replacement.

This problem is considered by I. G. Maloff and D. W. Epstein in a paper "Reflective optics in projection television" which appears in the proceedings of the National Electronic Conference, I, 1945, pages 204–5. Requirements outlined therein include:

1. That the tube should be movable along three rectangular coordinates, one of which (for "focusing") is along or parallel to the optical axis;

2. That tube replacement should be simple for non-technical personnel;

3. That easy over-all focusing, i. e. over-all reorientation of the emitting surface with respect to the mirror, should be possible after tube replacent;

4. That the tube mounting and the means for over-all focusing should be economical to manufacture; and 5. That the mounting must be sufficiently rugged to maintain factory adjustments during transportation.

One known method of supporting an end projection tube is with clamping means affixable to its neck. In some embodiments the neck-clamping means is movable in several directions crosswise to the system optical axis by a ball and socket swivel, and in a direction along (or parallel to) the optical axis by screw means. This method has many disadvantages.

First of all, not all cathode ray tubes are manufactured to exactly the same geometrical standard. In many tubes the bulb portion is slightly tilted with respect to the neck. Therefore, the target center and/or its center of curvature is not on the neck axis. In fact, even the gun axis may fail to coincide therewith. Of course, it must at least be assumed that the target surface has the same curvature as the ideal object surface (the conjugate, for the particular projection system, of the image surface) so that all parts thereof will be correctly oriented with respect to a spherical mirror when the target is at a proper distance from the mirror and when its center and its center of curvature are on the mirror axis. (Under these conditions field angle symmetry will be attained in addition to good focus). Despite the assumption, it is obvious, if the geometry of the tube is otherwise imperfect, that it will be impossible properly to orient the screen surface with respect to the mirror by manipulating a neck clamp to bring the neck axis onto the optical axis.

Aside from these objections, a ball and socket device does not readily lend itself to vernier adjustment, does not hold adjustment well, and is not adapted to simplify adjustments into a prescribed sequence by dividing them into rectangular coordinates.

Preferably, therefore, a tube support should be adapted to engage the enlarged screen end of the tube. If so, despite normal tube variations good results will be obtainable so long as the target itself is properly curved. The depth of electrical focus ordinarily is sufficient to maintain uniform beam focus over the target area despite the manufacturing defects described above. From one tube to another there will be variations in end wall thickness. When a tube is replaced this will affect "focus" by affecting the distance between the emitting surface and the mirror (or other optical element facing it along the optical axis). This and other small and unavoidable variations will necessitate reorientation of the support and the tube therein each time a tube is replaced. Preferably also focusing adjustments should be reduced to discrete adjustments along through rectangular coordinates, one along (or parallel to) the optical axis and two at right angles to each other in a plane perpendicular to the first.

The paper cited above suggests a screen end support and means for adjusting it along three rectangular coordinates. A ring-shaped tube clamp is used which may be attached to a stand (such as wall of a projector housing) by a system of supports. These are movable with respect to each other and to the housing via sliding surfaces and slot-forming elongated holes which permit movement over small ranges in the required three directions.

Screws serve to lock the various supports in place except when movement is desired for adjustment purposes. However, the very act of loosening or tightening these screws changes the orientation of the tube. The screws must be loosened to permit readjustments and the adjustments are not complete until these screws are again tightened. Therefore, focusing is achieved by a succession of trial and error attempts. Moreover, in the absence of any drive means the adjustments are gross movements achieved by bumping or jarring the supports to move them. The structure shown in that paper could be somewhat improved by the substitution of long machined ways for the slots and by the addition of vernier driving means. However, the resulting structure would be difficult to make and expensive. Moreover, a complex of long machined ways inside of the projection cabinet would tend to block light passing from the mirror to a viewing screen.

It is the object of the present invention to devise improved tube supporting-and-focusing means which do not comprise expensive machined ways and which include simple drive means, whereby vernier focusing adjustments can be separately made in three substantially-rectilinear directions which are substantially at right angles to each other.

It is a further object of this invention to devise improved supporting-and-focusing means which have the same rigidity when adjustments are being made as at other times and may be locked, once adjusted, without spoiling the adjustment.

These and other objects of this invention will be apparent from the following description of an embodiment of this invention and from the drawings, in which:

Fig. 1 is a top view of an embodiment of this invention. The cover of the projector housing, the focusing knobs, and the "crank shaft" are removed to expose to view the "ring clamp" and the spherical mirror inside the housing;

Fig. 2 is a fragmentary cross-sectional view of part of the housing, showing the engagement of the "crank shaft" and the "boom"; and Fig. 3 is a transverse sectional view showing how the "ring clamp" is supported in the housing on an eccentric.

Housing 1 of Fig. 1 is a boxlike structure, having fastened to its bottom a spherical mirror 2, which is concave in the direction upwards out of the drawing. Ring clamp 3 is a ring-shaped portion of the tube support assembly. It has, in its inner periphery, an annular seat which is formed to receive the large end of a projection cathode ray tube. The inner surface of this seat may be suitably padded with a layer of rubber or other resilient material to form a shock mounting for the glass tube. Such a layer will make it possible for the ring clamp to yield and accommodate itself to tubes of slightly different sizes. Supporting arms 4, 4a are additional portions of the tube support. They extend from widely separated points on the external periphery of ring clamp 3 and converge into bearing 5. Arms 4 and 4a should preferably be long enough so that the distance between the center of the ring clamp and the center of bearing 5 is greater than the radius of the circle defined by the upper edge of mirror 2. These arms, as can be more readily seen in Fig. 3, are tapered down in width from bearing 5 towards ring clamp 3 (the "width" being measured in directions parallel to the axis of bearing 5) so that the center of gravity of the entire assembly is near to bearing 5, and so that the arms can withstand considerable force exerted along the axis of mirror 2. Because of the triangular structure comprising arms 4 and 4a and the part of the ring clamp periphery which separates them, this assembly will also be able to withstand forces exerted in other directions without being easily twisted or bent. Bearing 5 contains an internally finished cylindrical socket. As will be seen this socket supports the weight of the support assembly along with the tube carried in it.

A boom consisting of two more arms 6, 6a also comprises part of the support assembly and similarly extends from the outer periphery of ring clamp 3 as shown in Fig. 1. Its long axis is substantially at right angles to a line between the center of ring clamp 3 and the center of bearing 5 and coplanar therewith. Formed in the outer end of the boom is a slotted element 7, which contains a machined slot running in a direction perpendicular to the axis of the boom (and, therefore, parallel to the line connecting the centers of clamp 3 and bearing 5).

In Fig. 3 there is shown the manner in which the tube support, and the tube carried therein, are carried on bearing 5. A strut 8 is attached to wall 9 of housing 1 at a distance below the top of the housing which is somewhat greater than the length of bearing 5. It has an internally threaded hole 10, engaging external threads on the bottom end of focusing shaft 11. At a short distance above strut 8 there is fastened to shaft 11 a flanged collar 12. The upper surface of the flange is finished to provide a thrust bearing surface upon which the heel or bottom end of bearing 5 may rest. The diameter of this bearing surface preferably should be somewhat larger than that of the heel of bearing 5. The reasons for this will become obvious after the complete description herein. Eccentric 13 has its exterior surface machined to fit tightly into the cylindrical socket in bearing 5 and is bored internally to fit tightly over shaft 11. The internal bore is eccentric with the exterior surface. Therefore, in operation when eccentric 13 is rotated about shaft 11, the exterior surface acts as a cam in bearing 5 driving the support assembly leftward or rightward in the drawing. At the upper end of eccentric 13, a portion of its exterior surface is of reduced diameter and is concentric with the internal bore. This sleeve-like portion fits into and through a hole (in the cover of housing 1) the hole serving as a bearing for it. A knob 14 is attached to a protruding portion of this sleeve. Therefore, carried with its lower end on shaft 11 and its upper end in the hole eccentric 13 can be rotated simply by turning knob 14. A loaded spring 15 is fitted over cam 13 with its respective opposite ends pressing up against the inner surface of the cover of housing 1 and down against the top of bearing 5. Spring 15 forces bearing 5 downward along eccentric 13, against the thrust bearing surface of flange 12.

A knob 11a is affixed to the top end of shaft 11. In operation, when knob 11a is turned in the direction to screw shaft 11 downward into strut 8, flange 12 is progressively lowered and bearing 5 is forced downward after it by spring 15 thus moving the entire tube support assembly toward the mirror. When knob 11a is rotated in the opposite direction, flange 12 is progressively raised forcing bearing 5 upward, compressing spring 15 and moving the support away from the mirror. Due to an anchoring action of the boom 6, 6a, the large end of the tube support assembly is prevented from swinging, on bearing 5, to describe an arc in the plane of ring clamp 3. However, the bearing end is free to follow displacements of the outer surface of eccentric 13 which occur when knob 14 is turned. Moreover, the boom does not anchor the large end of the assembly against movement in the direction of the slot in element 7. Therefore, when knob 14 is turned the ring clamp is driven leftward or rightward in the drawing within a narrow range and for a distance governed by the amount of rotation of the knob.

In Fig. 2 crank shaft 16 is shown extending between a supporting hole in the top of housing 1 and a second strut 17 which is attached to wall 18 of housing 1. A knob 19 is affixed to the top end of crank shaft 16 and permits it to be rotated manually. A crank pin 20 is fastened into an off-center hole formed in the bottom end of crank shaft 16 with its axis parallel to the shaft axis. Crank pin 20 passes through the slot in slotted element 7. It is long enough so that it continues to be engaged by the slot throughout the entire range of travel over which the tube support assembly (which includes the boom) is raised or lowered by rotation of knob 11a. In operation, when knob 19 is turned the boom (and the large end of the assembly) is driven rightward or leftward in Fig. 2 (downward or upward in Fig. 1; out of the sheet or into the sheet in Fig. 3). Obviously this displaces the ring clamp along a substantially rectilinear path which is substantially perpendicular to the path of the displacements caused by turning knob 14.

The geometry governing the movements of ring clamp 3 when either knob 14 or knob 19 is turned is obvious and need not be analyzed rigorously herein. It is obvious, however, that if, in one adjustment, only knob 14 is moved, then the ring clamp will be prevented from moving either upward or downward in Fig. 1 by the anchoring action of the crank pin in the slotted portion of the boom while at the same time it will be driven leftward or rightward in Fig. 1. This movement will not be impeded by the crank pin as it is in the direction of the slot, which, of course, can freely slide along the crank pin. Similarly, if in a single adjustment only knob 19 is moved ring support 3 will be anchored against leftward or rightward movement (in Fig. 1) by the cooperative effect of bearing 5, the elements carrying it, and the arms 4 and 4a while instead it will be driven upward or downward in Fig. 1 by the crank action of crank shaft 16 and crank pin 20.

In Fig. 3 the ghost outline of a tube is shown with the face of the tube in position in the ring clamp 3. In practice, the tube preferably should be locked to the clamp, for example, a padded saddle 3a may be dropped over the neck of the tube and set in place on the flared-out bulb portion thereof, and straps 3b joining the saddle and the ring clamp may be employed to draw the tube down tightly into position in the annular seat. These or some other convenient means for clamping the tube in the ring clamp should be employed. The exact manner in which the tube is clamped to the ring clamp is not an essential part of this invention.

As will be seen in Fig. 3 a correcting plate 21 is included in the embodiment shown and appears to be fitted into a seat in the edge of a large round opening in the cover of housing 1. Any convenient means may be employed to hold it in place and/or to adjust its position with respect to the mirror. It is obvious that in the position of the housing in Fig. 3 light will be projected upward. This position may be suitable for certain applications such as in the cabinet of a home receiver. However, for other applications, i. e. where projection is desired toward a wall or a wall-mounted screen, housing 1 may be placed on its side. Because of the use of spring 15 and because the tube is clamped into the ring clamp, it will not be necessary to rely upon gravity to hold together the elements and this apparatus will work as well standing on its side as standing on its bottom.

It is obvious that means may be provided for locking knobs 14 and 11a and 19 in any rotational position to which they have been turned for adjustment purposes. Such means might be in the form of detents, locking set screws, friction springs, etc., any of which are well known.

It is obvious also that the boom shown herein (comprising arms 6 and 6a) can be replaced by a single connecting rod having a 360° bearing surface (rather than a slot) fitted over crank pin 20 and having its other end pivoting on (or in) a fixture on the outer periphery of ring clamp 3. A connecting rod could perform the essential function required of the boom, i. e. to anchor the large end of the tube support assembly against movement upward or downward in Fig. 1 at a point of adjustment primarily controlled only by the rotational position of knob 19.

What I claim is:

1. In a television projector having a housing and a spherical mirror therein, a focusing arrangement including a tube support assembly comprising a ring clamp and an attached supporting arm, a cylindrical bearing on the arm with its axis perpendicular to the plane of the ring clamp, a threaded shaft engaging threads provided in the housing and mounted thereon with its axis to one side of and parallel to the axis of the mirror, eccentric means, comprising a sleeve having inner and outer cylindrical bearing surfaces which are eccentric to each other and have parallel axes, the inner surface being borne on said shaft and said bearing being borne on said outer surface, for carrying the supporting assembly and for controlling within a narrow range and by rotations of the sleeve the distance between the centers of the ring clamp and the shaft, means for manually rotating the sleeve, said arm extending in such a direction from the sleeve and being of such length that the center of the clamp is near to the mirror axis, means for rectilinearly moving said bearing in a direction along said sleeve in response to rotations of said threaded shaft and to the resultant variations in its engagement with said threads in the housing, means for manually rotating the threaded shaft, a boom extending from the periphery of the ring clamp in a direction substantially perpendicular to the line of the centers of the clamp and the bearing, means comprising a second shaft rotatably supported on the housing and an element connected thereto and engaging the boom for effecting, in response to rotations of the second shaft and within a narrow range, arcuate movements of the assembly about the sleeve and for anchoring it against free arcuate movement when the second shaft is not moved.

2. A focusing arrangement as in claim 1, in which said means for rectilinearly moving comprises means for urging the bearing in one direction along the outer surface of the sleeve, a flange connected to the threaded shaft and having a thrust bearing surface in contact with one end of said bearing for determining to what point along the sleeve it may move in response to said urging and for changing the position of said point in either of two directions in response to said rotations of the threaded shaft and to the said resultant variations in its engagement with the threads in the housing.

3. A focusing arrangement as in claim 1, in which the ring clamp includes an annular seat for receiving the screen end of a cathode ray tube, and means for clamping the tube in the seat.

4. A focusing arrangement as in claim 1, in which said sleeve comprises an extended portion, the outer surface of which is concentric with a continuation of said inner bearing surface, and in which means for manually rotating the sleeve comprises a knob attached to said extended portion.

5. A focusing arrangement as in claim 1, in which said element connected to the second shaft is a crank pin, said boom has a slotted portion surrounding the pin with the slot extending in a direction parallel to said line of centers of the ring clamp and the bearing and having a greater length in said direction than said narrow range over which the distance between the centers of the ring clamp and the shaft can be controlled by rotations of the sleeve, and in which the width of the slot is substantially equal to the diameter of the crank pin.

6. A focusing arrangement as in claim 1, in which said element connected to the second shaft is a crank pin, one end of said boom is connected to the periphery of the ring clamp by a pivot about which the boom can swing in the plane of the ring clamp, and the crank pin engages the boom by fitting into a bearing carried near the other end thereof.

GEORGE K. SCHNABLE.

REFERENCES CITED

The following references are of record in the file of this patent:

UNITED STATES PATENTS

| Number | Name | Date |
| --- | --- | --- |
| 493,358 | Hunter | Mar. 14, 1893 |
| 580,836 | Hunter | Apr. 13, 1897 |
| 978,317 | Lutz | Dec. 13, 1910 |
| 2,285,509 | Goshaw | June 9, 1942 |
| 2,388,761 | Patterson, Jr. | Nov. 13, 1945 |
| 2,424,513 | Stephan | July 22, 1947 |

FOREIGN PATENTS

| Number | Country | Date |
| --- | --- | --- |
| 841,458 | France | May 22, 1939 |

OTHER REFERENCES

Reflective Optics in Projection Television. Dec. 1944, Electronics, pages 98–105.